United States Patent
Braun et al.

(10) Patent No.: US 6,232,817 B1
(45) Date of Patent: May 15, 2001

(54) TEMPERATURE STABILIZATION OF A PREDISTORTER WITH VOLTAGE SUPPLY

(75) Inventors: Klaus Braun, Stuttgart; Werner Berger, Ditzingen, both of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/352,792

(22) Filed: Jul. 14, 1999

(30) Foreign Application Priority Data

Jul. 15, 1998 (DE) .............................................. 198 31 716

(51) Int. Cl.[7] .................................................... H03L 5/00
(52) U.S. Cl. ............................ 327/331; 327/362; 327/513
(58) Field of Search .................................. 327/307, 317, 327/318, 346, 362, 512, 513, 331

(56) References Cited

U.S. PATENT DOCUMENTS

| 3,914,624 | * | 10/1975 | Jackson | 307/229 |
| 5,161,044 | | 11/1992 | Nazarathy et al. | |
| 5,162,678 | * | 11/1992 | Yamasaki | 327/331 |
| 5,172,068 | * | 12/1992 | Childs | 328/162 |
| 5,210,633 | | 5/1993 | Trisno | |
| 5,939,920 | * | 8/1999 | Hiraizumi | 327/306 |
| 6,037,823 | * | 3/2000 | Arai et al. | 327/307 |

FOREIGN PATENT DOCUMENTS

WO 97/35390    9/1997 (WO).

* cited by examiner

Primary Examiner—Kenneth B. Wells
Assistant Examiner—Paul Dinh
(74) Attorney, Agent, or Firm—Sughrue, Mion, Zinn, Macpeak & Seas, PLLC

(57) ABSTRACT

A method of stabilizing the working point of a predistorter diode of a predistorter for an optical modulator as protection from temperature fluctuations, whereby the predistorter diode is supplied with a temperature-dependent voltage in order to adjust the working point, is characterized by the fact that a reference diode is thermally coupled with the predistorter diode so that the reference diode is supplied with a constant current, whereby it is not supplied with a signal distorted by the predistorter, and the predistorter diode is supplied with a voltage which is proportional to the reference diode.

One advantage of the invention is that it is possible to achieve good temperature stability in an easy manner.

10 Claims, 2 Drawing Sheets

US 6,232,817 B1

TEMPERATURE STABILIZATION OF A PREDISTORTER WITH VOLTAGE SUPPLY

BACKGROUND OF THE INVENTION

The invention relates to a method of stabilising the working point of a predistorter diode of a predistorter for an optical modulator as protection from temperature fluctuations, whereby the predistorter diode is supplied with temperature-dependent voltage in order to adjust the working point.

In order to adjust the working point of a diode in a network which influences the signal, voltage impression is known on the one hand, and current impression on the other. U.S. Pat. No. 5,161,044, FIG. 15, shoes a diode network to linearise the output signal of an external optical modulator through which the light leaving a light source is modulated. The diodes here are connected with voltage sources. As these are semiconductor diodes, their current/voltage characteristic is dependent on temperature. Accordingly, the working point of the diode changes under temperature changes without any special measures, because the voltage supplied to the diode is constant. Also known is guidance of the voltage of predistorter diodes by means of a computer according to a temperature table, whereby a temperature sensor and an analog/digital converter and a digital/analog converter are required. However, this creates a relatively large workload.

In addition, an arrangement with current impression is known from U.S. Pat. No. 5,210,633, FIG. 2. In this arrangement, the DC voltage at the diode changes depending on the level fluctuations of the signal passed through the diode, which can be a high-frequency signal. In this known arrangement, when the diode network consists of a predistorter for linearising the output signal of an optical modulator, it is possible for the working point to be optimally adjusted just for one single value of the amplitude of the high frequency signal. In this known arrangement, it is necessary to guide the current source according to the amplitude for optimum linearisation of the characteristic curve.

SUMMARY OF THE INVENTION

The invention is based on the task of reducing by simple means the temperature dependence of a predistorter diode fed with voltage in order to adjust the working point. This task is solved by the present invention by the fact that a reference diode is thermally coupled with the predistorter diode, that the reference diode is supplied with a constant current, whereby it is not supplied with a signal distorted by the predistorter, and that the predistorter diode is fed with a voltage which is proportional to the voltage at the reference diode.

The invention also includes an apparatus for stabilising the working point of a predistorter diode of a predistorter, and a predistorter of an external optical modulator.

One advantage of the invention is the fact that good temperature stability is achieved in a simple way. The current supply to the reference diode means that its current is not dependent on temperature. Ageing of the predistorter diode is not a problem because the reference diode also ages. It may be sufficient to use as reference diode a diode whose properties relating to change of the working point under temperature change are similar to but not fully identical with the predistorter diode. But it is particularly beneficial and easy to take the same type of diode for the reference diode as for the predistorter diode. Seeing that no high frequency is supplied to the reference diode, the working point of the reference diode and thus the voltage here changes only depending on the temperature.

One further advantage is that the predistorter diode is decoupled from the current supplied to the reference diode. An amplifier, or preferably an operation amplifier, can be used for this purpose. Another advantage is that the voltage loss at the reference diode is fed to the predistorter diode by means of an operation amplifier. A control unit is given particular preference here.

BRIEF DESCRIPTION OF THE DRAWINGS

Other features and advantages of the invention are indicated in the following description of execution examples of the invention on the basis of the drawing, which shows essential details of the invention, and from the patent claims. The individual features can be implemented each for itself or in any required combination in an executed version of the invention. The illustrations show the following:

DETAILED DESCRIPTION OF THE INVENTION

Figure 1:
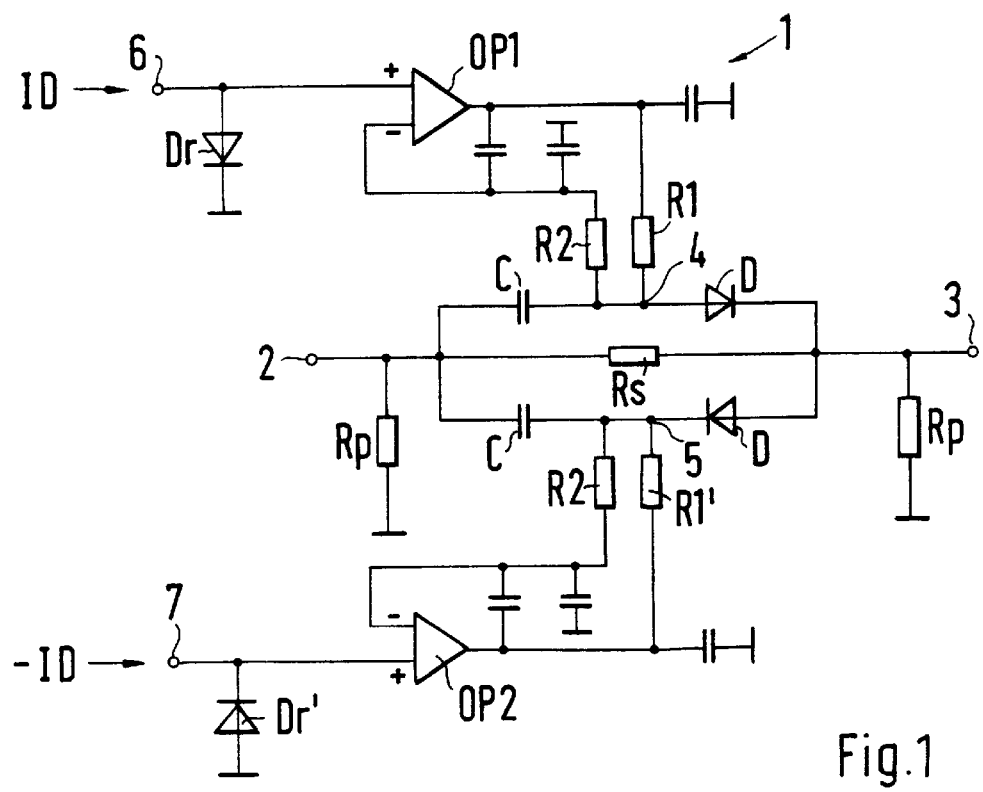
FIG. 1 a predistorter circuit of an optical modulator with altogether two predistorter diodes in anti-parallel connection, and two reference diodes.

In FIG. 1 the signal path of a predistorter circuit 1 is located between a connection 2 (input) and a connection 3 (output). The significance of these connections 2 and 3 could also be exchanged. Connection 2 on the one hand and connection 3 on the other hand are each earthed via an ohmic resistance Rp, and connections 2 and 3 are connected to each other by means of a resistance Rs. High-frequency components of the signal flow from connection 2 to connection 3, and also via two parallel branches each formed from the series connection of a capacitor C and a diode D (semiconductor diode), whereby the diodes in the two branches have opposite polarity and the capacitors C are directly connected to each other. An operation amplifier OP1 has an output which is connected via a resistance R1 with the connection point 4 between the capacitor C and the anode which is connected to the connected diode D of the upper branch. The connection point 4 is also connected via a resistance R2 to the inverted input of the operation amplifier OP1. The not inverted input of operation amplifier OP1 is connected to the anode of a reference diode Dr, whose cathode is earthed. The anode of reference diode Dr is supplied with a constant diode current ID via connection 6 when the arrangement is in operation. Some of the leads leading to operation amplifier OP1 are connected in the illustrated manner with capacitors to earth and to each other, in order to keep high frequency from the signal path between connections 2 and 3 away from the operation amplifier OP1.

That part of the signal path which belongs to the lower diode D In FIG. 1, with opposite polarity as the upper diode D, is similarly connected to an operation amplifier OP2 and a reference diode Dr', because the output of the operation amplifier OP2 is connected via the corresponding resistance R1' to a connection point 5 with the cathode of the diode D of the lower branch, so that this operation amplifier OP2 has to supply a negative output voltage. This is why the reference diode Dr', of the lower branch has opposite polarity to the reference diode Dr of the upper branch, and it is supplied via connection 7 with a constant diode current with negative polarity.

The shown circuit for operation amplifiers OP1 and OP2 ensure that these have a voltage amplification with the value of 1, and that they control the voltage at connection point 4 and 5 in each case to the voltage present at the corresponding reference diode Dr respectively Dr'. In spite of the presence of the resistances R1, R1', this results for the DC current working point in the effect of a voltage supply to the connection points 4 and 5.

Figure 2:
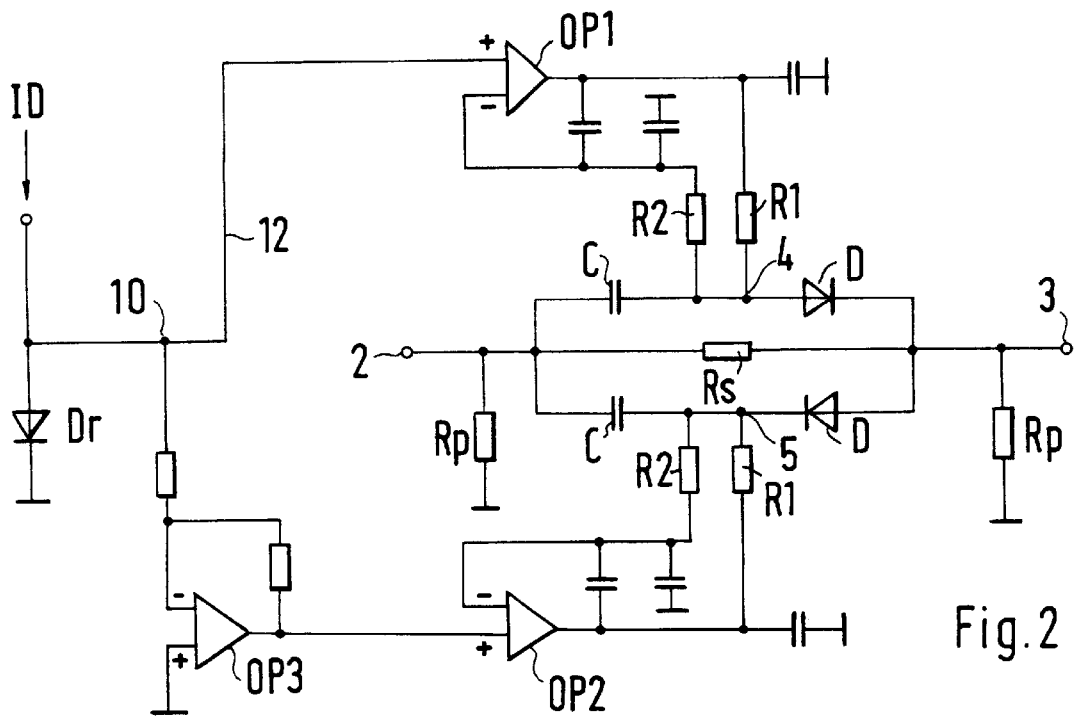
FIG. 2 an arrangement similar to FIG. 1, but with only one single reference diode, whose voltage loss for the lower branch of the circuit is reversed in polarity by means of an inverter.

The arrangement according to FIG. 2 is very similar in its functions to the arrangement in FIG. 1, so that only the differences are described. The difference consists only in the fact that here there is only one single reference diode Dr, but here again this is supplied with a constant current. The falling voltage at reference diode Dr is present at a switching point 10, and is supplied from this via a lead 12 directly to the not inverted input of the operation amplifier Op1. Insofar there is no difference to the arrangement in FIG. 1. However, the voltage at connection point 10 is also inverted in its polarity by an inverter which is formed in the known way by an operation amplifier OP3, and supplied to the not inverted input of the operation amplifier OP2 of the lower branch in FIG. 2. In this way, the inverter OP3 supplies the operation amplifier OP2 under otherwise identical conditions with a voltage in exactly the same size and potential as is the case for operation amplifier OP2 in FIG. 1.

Figure 3:
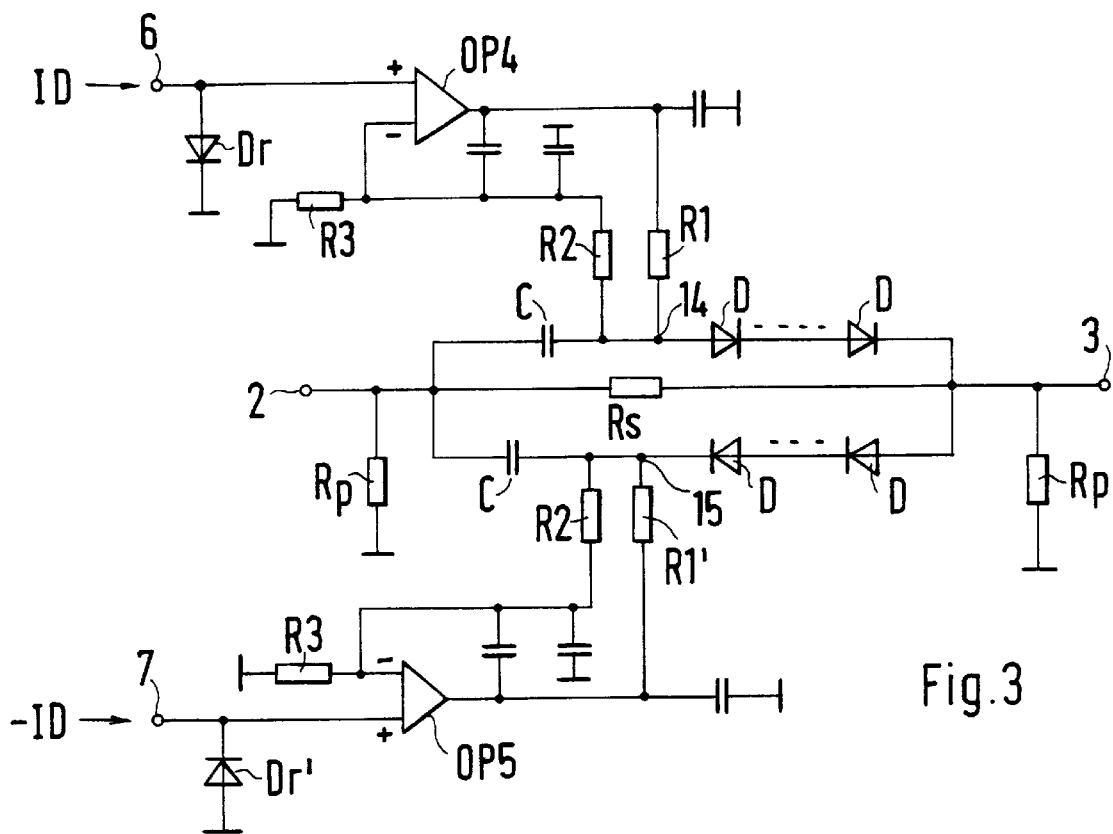
FIG. 3 a modification of FIG. 1, in which there is a series connection of several predistorter diodes in each of the parallel branches instead of just one single predistorter diode.

For the arrangement according to FIG. 3, again only the differences compared to the arrangement in FIG. 1 are mentioned. The differences consist in the fact that instead of one single diode D in every branch between connections 2 and 3, there are several diodes instead (in each case the same number of diodes). In order to have the same voltages for example, at each of these diodes as at diode D in FIG. 1, the operation amplifier OP4 corresponding to operation amplifier OP1 must supply higher voltage by the factor of N which corresponds to the number of diodes in a branch. This is achieved by means of a voltage divider at the inverting input of the operation amplifier OP4. This inverting input is connected on the one hand via the ohmic resistance R3 of size R0 with earth, and on the other hand, the ohmic resistance R2 has size (N−1)×R0, which connects the inverting input with the connection point 14, whose position in the upper branch of the diodes corresponds to the connection point 4 of FIG. 1. The lower branch of the arrangement according to FIG. 3 is circuited in a corresponding manner. Several predistorter diodes connected in series are used. for example, if the required distortion characteristic curve cannot be generated with just one predistorter diode. Here again, the operation amplifiers OP4 and OPS which supply connection points 14 and 15, form control circuits, but with a voltage amplification factor deviating from 1.

The two reference diodes in the arrangement as per FIGS. 1 and 3, respectively the sole reference diode in the arrangement as per FIG. 2, are arranged in close thermal coupling with the diodes D between connections 2 and 3, so that they are practically at the same temperature and thus provide very good compensation of temperature dependence of predistorter diodes D. For example, if the temperature of predistorter diode D increases, and thus the temperature of reference diode respectively reference diodes Dr and Dr' increases, then the inner resistance U/I decreases, i.e. the voltage at the reference diode decreases. This reduced voltage of the reference diode ensures that reduced voltage is also present at the predistorter diodes, which however results in basically the same current flowing through the diodes as before the presumed temperature change, because of the correspondingly lesser DC resistance of the predistorter diodes. In this way, the working point of the diodes is essentially preserved.

In all arrangements, the resistance R1 serves to decouple the corresponding operation amplifier from the high frequency signal on the signal path between connections 2 and 3. The resistances used in the illustrated circuit arrangements are extremely low in inductance and capacity. Preferably, so-called SMD resistances (surface-mounted devices) should be used. The circuit can therefore be operated without any further problems up to a frequency of approx. 860 MHz, for example.

Figure 4:
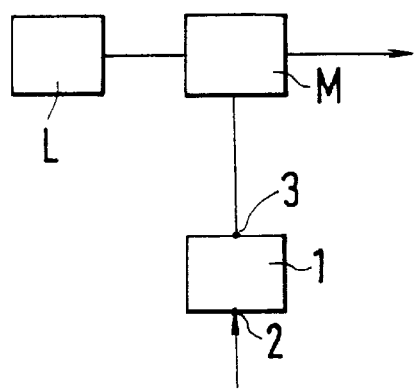
FIG. 4 a main line circuit diagram of the arrangement with an optical modulator and a diode network in accordance with the invention as predistorter circuit.

In the arrangement shown in FIG. 4, a light source L emits unmodulated light, which is supplied to the input of an external optical modulator M via an optical fibre, and leaves modulator M as modulated light. The modulation signal is supplied to the modulation input of modulator M via the signal path between connections 2 and 3 of arrangement 1 as per FIG. 1 (or the other illustrated arrangements). It is also possible to insert an amplifier in the signal path between arrangement 1 and modulator M.

In the example, the external modulator has a known phase modulator arrangement with an optical element on the basis of lithium niobate ($LiNbO_3$). The output signal of this kind of modulator is essentially a cosine square function of the input signal; if the input signal thus undergoes a linear increase, then the output signal of the modulator has a sinusoidal course. The predistorter circuit according to the invention has the task of linearising the first half period symmetrically to the reversal point of the sinus curve. First the modulation signal is changed by the predistorter in such a way that on subsequently being supplied to the modulator, it generates the required modulated light signal which is linear in relation to the not predistorted modulation signal (=high frequency signal).

What is claimed is:

1. A method for stabilising the working point of a predistorter diode of a predistorter circuit for an optical modulator circuit as protection from temperature fluctuations, whereby the predistorter diode is supplied with a temperature-dependent voltage in order to adjust the working point, said method comprising the steps of:

thermally coupling a reference diode to a predistorter diode, supplying the reference diode with a constant current which is not distorted by the predistorter, and applying across the predistorter diode a voltage which is proportional to the voltage across the reference diode.

2. An apparatus for stabilising the working point of a predistorter diode of a predistorter circuit for an optical modulator circuit as protection from temperature fluctuations, whereby during operation the predistorter diode is supplied with a temperature-dependent voltage in order to adjust the working point, said apparatus comprising:

a reference diode which is thermally coupled to the predistorter diode, a constant current source coupled to said reference diode, whereby the reference diode is supplied with a signal which is not distorted by the predistorter, and a means for applying across the predistorter diode a voltage which is proportional to the voltage across the reference diode.

3. An apparatus in accordance with claim 2, further comprising:

a means for decoupling the predistorter diode from the current supplied to the reference diode.

4. An apparatus in accordance with claim 3, wherein:

the means for decoupling includes an amplifier.

5. An apparatus in accordance with claim 4, wherein:

the means for decoupling includes a control unit.

6. An apparatus in accordance with claim 4, wherein:

the amplifier is a voltage amplifier, and said amplifier has the same input voltage as the voltage which is supplied to the reference diode.

7. An apparatus in accordance with claim 6, wherein:

a signal path for the signal to be distorted includes two parallel branches each with a series connection of a capacitor and at least one predistorter diode, wherein the at least one predistorter diode of one branch has a polarity which is opposite to the polarity of the at least one predistorter diode of the other branch, a connection point between the capacitor and the at least one predistorter diode in every branch is coupled in each case to the output of an operational amplifier connected as a voltage amplifier, and the voltage across the reference diode is supplied to the non-inverting input of an operational amplifier with positive polarity, and to the non-inverting input of the other operation amplifier with negative polarity.

8. An apparatus in accordance with claim 7, wherein:

the non-inverting input of each operational amplifier is connected to a reference diode.

9. An apparatus in accordance with claim 7, wherein:

the non-inverting input of an operational amplifier is connected to a reference diode, and the voltage at this refernece diode is supplied to the non-inverting input of the other operational amplifier via an inverter.

10. A predistorter of an external optical modulator, characterised by an apparatus in accordance with claim 2.

\* \* \* \* \*